United States Patent [19]

Mizuhara

[11] Patent Number: 4,755,958

[45] Date of Patent: Jul. 5, 1988

[54] TEMPERATURE MEASURING APPARATUS

[75] Inventor: Hirohisa Mizuhara, Fukuyama, Japan

[73] Assignee: Mitsubishi Denki Kabushiki Kaisha, Japan

[21] Appl. No.: 885,775

[22] Filed: Jul. 15, 1986

[30] Foreign Application Priority Data

Jul. 17, 1985 [JP] Japan .................. 60-155956
Jul. 17, 1985 [JP] Japan .................. 60-155957

[51] Int. Cl.⁴ .............................................. G01K 3/00
[52] U.S. Cl. .................................. 364/557; 340/588; 374/102; 374/163
[58] Field of Search ............. 364/557; 374/163, 100, 374/102, 103, 101, 170; 340/584, 588, 589

[56] References Cited

U.S. PATENT DOCUMENTS

| 4,161,880 | 7/1979 | Prosky | 364/557 |
| 4,399,824 | 8/1983 | Davidson | 374/163 |
| 4,418,392 | 11/1983 | Hata | 364/557 |
| 4,532,601 | 7/1985 | Lenderking et al. | 364/557 |
| 4,562,554 | 12/1985 | Stixrud et al. | 364/557 |
| 4,592,003 | 5/1986 | Kobayashi et al. | 364/557 |

FOREIGN PATENT DOCUMENTS 58-214823 12/1983 Japan .
58-214824 12/1983 Japan .
2018434 10/1979 United Kingdom ............. 364/557

Primary Examiner—Parshotam S. Lall
Assistant Examiner—Brian M. Mattson
Attorney, Agent, or Firm—Leydig, Voit & Mayer

[57] ABSTRACT

A temperature measuring apparatus has temperature detecting means for detecting a temperature and producing a signal representative thereof, an A/D converter for converting the signal into a digital output signal, a memory for storing as temperature data the output signal of the A/D converter, read-out means for reading out corresponding temperature data from the memory and applying it to a processor, and wait means for setting a wait state by the read signal from the processor until the A/D conversion of the A/D converter is completed.

8 Claims, 4 Drawing Sheets

TEMPERATURE MEASURING APPARATUS

BACKGROUND OF THE INVENTION

The present invention relates to a temperature measuring apparatus using temperature detecting means, such as a thermistor, a temperature measuring resistor, or a thermocouple, for measuring temperatures by converting temperature changes into a resistance variation or a thermal electromotive force and measuring the resistance value or the thermal electromotive force.

In a prior-art temperature measuring apparatus, temperature is measured by using a thermistor or a temperature measuring resistor for converting a temperature change into a resistance variation or a thermocouple for outputting a thermal electromotive force. However, since these elements produce non-linear resistance variation and thermal electromotive force with respect to the temperature change, it is necessary to include means which provide linearizing functions so as to increase the measuring accuracy, especially when used to measure a wide temperature range. FIG. 1 shows a temperature-resistance change of a typical thermistor. In FIG. 1, the abscissa axis represents temperatures T and the ordinate axis represents values R. Since the temperature cannot be directly read out from the resistance value if the non-linear varying characteristic of the curve shown in FIG. 1 is used, means providing a linearizing function, such as shown in FIG. 2, is incorporated. In FIG. 2, reference numeral 1a denotes temperature detecting means, numeral 1 denotes a thermistor connected in parallel with a resistor 2, further connected in series with a resistor 3, and connected between a power source P and ground E of the circuit. Thus, a voltage V between the ground E and the terminal t is produced as an output in accordance with the resistance of the thermistor 1.

FIG. 3 illustrates a curve representing a relationship between the output voltage V and the temperature. As shown, the abscissa axis represents temperatures T and the ordinate axis represents voltages V. It is noted that, as the temperature rises, the output voltage drops substantially linearly. When the resistors 2 and 3 are adequately selected, the curve in this graph can be formed to be substantially linear. However, if the measuring range is wide or an accurate temperature measurement is necessary, this linearization is insufficient.

In the temperature detecting means of the above-described temperature measuring apparatus, it becomes necessary to provide a further linear characteristic if the measuring temperature range is widened or an accurate temperature measurement is necessary, but, to this end, a linearizing circuit called a "linearizer" is necessary. However, such a circuit must use a number of accurate resistors, variable resistors, or operational amplifiers, its regulation is complicated, and it is expensive to provide accurate parts.

SUMMARY OF THE INVENTION

The present invention has been made in order to eliminate the above-stated disadvantages and has for its object to provide a temperature measuring apparatus capable of producing an accurate measured value over a wide temperature range without the necessity of a linearizing circuit of a complicated configuration even if a temperature sensor having a nonlinearity is used.

More particularly, the temperature measuring apparatus according to the present invention comprises means for converting the output voltage of temperature detecting means, using a temperature sensor such as, for example, a thermistor or a thermocouple, by an A/D converter into a digital signal, reading out temperature data corresponding to the digital signal written in advance in a memory such as a ROM IC corresponding to the digital signal, processing it by a processor formed, for example, of a microcomputer, and setting the processor in a wait state by a lead signal from the processor until the A/D conversion of the A/D converter is finished.

DESCRIPTION OF THE PREFERRED EMBODIMENTS

Figure 4:
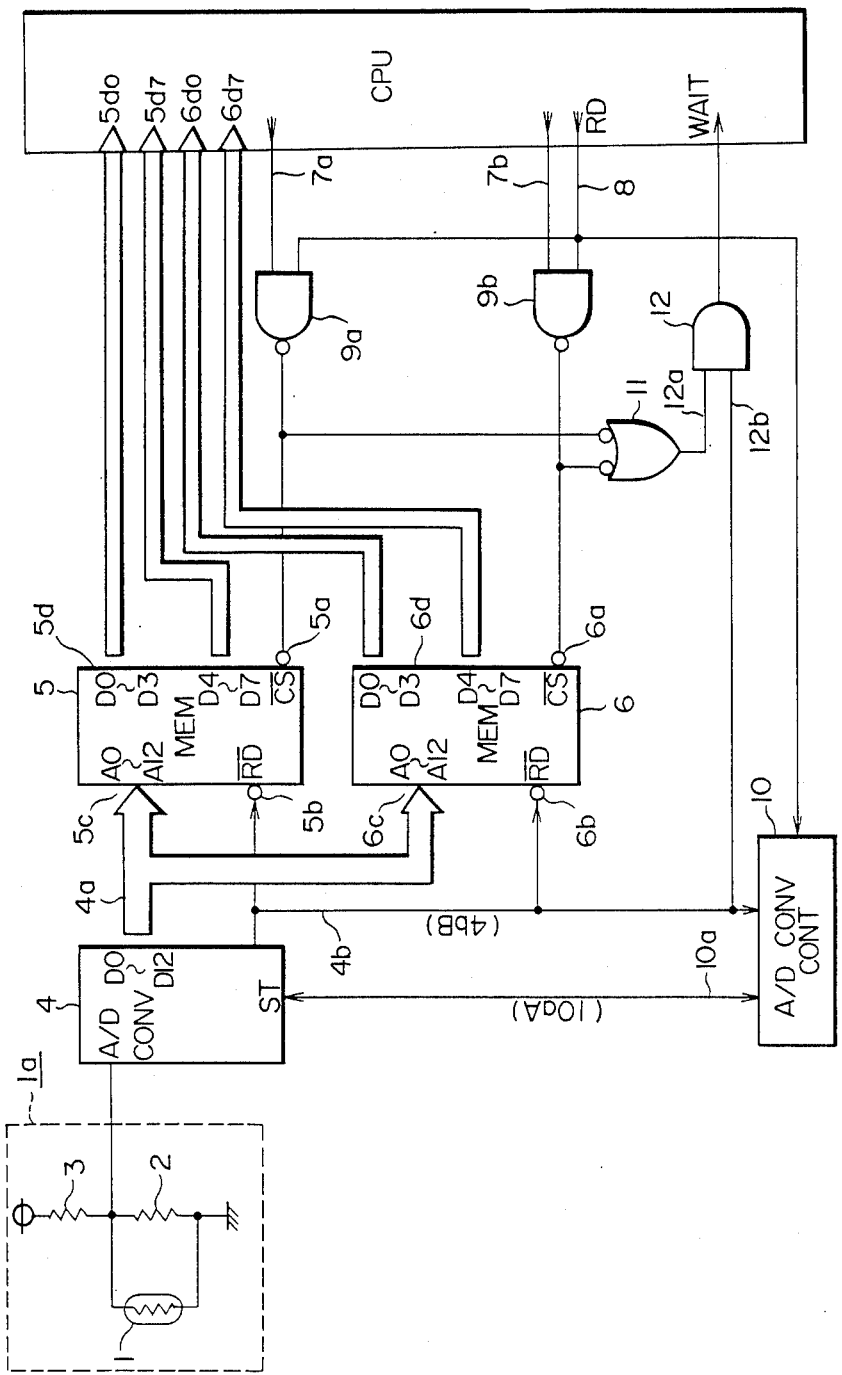
FIG. 4 is a block circuit diagram showing an embodiment of a temperature measuring apparatus according to the present invention.

FIG. 4 illustrates an embodiment of the present invention in which numeral 1a designates temperature detecting means having a thermistor 1 as a temperature sensor, a resistor 2 connected in parallel with the thermistor 1, and a resistor 3 connected in series with the thermistor 1 and the resistor 2. Numeral 4 designates an analog-to-digital converter (hereinafter referred to as an A/D converter) receiving an output voltage of the temperature detecting means 1a and converting the output voltage into a digital signal. Numerals 5 and 6 designate memories in the form of nonvolatile ROM ICs which do not lose data even if the power is interrupted. The memories 5 and 6 have chip select (CS) signal terminals 5a and 6a, read out (RD) signal terminals 5b and 6b, address (An) terminals 5c and 6c, and data (Dn) terminals 5d and 6d. Numeral 4a designates a data transmission line for inputting digital signals $D_0$ to $D_{12}$ from the A/D converter 4 to the address terminals 5c and 6c of the memories 5 and 6, thereby directly accessing the addresses of the memories 5 and 6 by the digital signals. Numeral 4b designates a conversion end signal output line for applying the conversion end signal 4bB of the A/D converter 4 to the read-out signal terminals 5b and 6b and an A/D converter controller 10, and the read-out signal terminals 5b and 6b become active by the conversion end signals 4bB. Numerals $5d_0$, $5d_7$, $6d_0$, $6d_7$ designate data lines of a read-out means for feeding the read out temperature data from the data terminals 5d and 6d, for example, to a CPU. Numeral 10a designates a control signal line for applying the control signal 10aA from the A/D converter controller 10 to the A/D converter 4, and numerals 9a and 9b designate AND gates which receive decode signals 7a and 7b and a read (RD) signal 8 from the processor and apply outputs to the chip select terminals 5a and 6a to activate or deactivate the memories 5 and 6 (depending on logic levels of the outputs). Numeral 11 designates a gate circuit which also receives the outputs of the AND gates 9a and 9b and provides an output to one terminal 12a of an AND gate 12 connected thereto. The AND gate 12 receives at another terminal 12b a conversion signal 46B on the conversion end signal output line 4b and operates a wait means for outputting a wait signal (WAIT) to be sent to the processor (not shown).

Therefore, since the address signals A0–A12 of the memories 5 and 6 have a 13-bit configuration to accommodate the 13-bit configuration of the A/D converter 4, the memories 5 and 6 require at least $2^{13}=2^3\times 2^{10}=8\times 1024=8$ kilobytes in capacities. On the other hand, if the A/D converter 4 has only 12-bit data lines $D_0$–$D_{11}$, only 4-kilobyte ICs are necessary. If 8-kilobyte ICs are used, it is necessary to permanently connect address lines A12 at the address signal terminals 5c and 6c to a logic H or L. As shown, the memories 5 and 6 have 8-bit configuration data lines $D_0$ to $D_7$. As a common practice, an 8-bit data signal ($D_0$–$D_7$) can be converted into a 2-digit BCD signal such that, when the memories 5 and 6 are used with 16 data bits, 4-digit BCD signals may be formed. In this embodiment, the 4-digit BCD signals are denoted by $5d_0$, $5d_7$, $6d_0$, $6d_7$.

However, the present invention is not limited to the use of BCDs. When binary signals are used, 16-bit configurations may be employed to accomodate 16-bit data signals.

In the memories 5 and 6, temperature data corresponding to the digital output signal are written in advance in the addresses Corresponding to the digital output signals of the A/D converter 4 as the contents of the memories.

Figure 5:
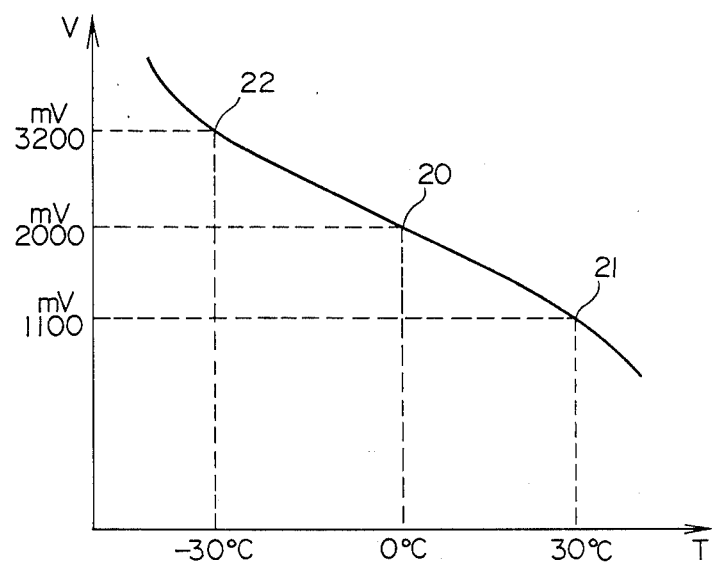
FIG. 5 is a view of temperature-voltage for explaining the operation of FIG. 4.

In the temperature measuring apparatus constructed as described above, the relationship between the output voltage V of the temperature detecting means 1a, using the thermistor 1 shown in the characteristic graph of FIG. 5, and the temperature T data is measured and calculated, and the temperature data, representing the output voltage, are stored in the memories 5 and 6. In FIG. 5, the point 20 on the graph is a point at 0° C., and the output voltage at this time is 2.0 V.

The point 21 is at 30° C., and the output voltage at this time is 1.1 V. Similarly, the point 22 is at −30° C., and the output voltage at this time is 3.2 V. The graph is not linear, but, if the values of the series resistor 2 and the parallel resistor 3 are determined, a predetermined curve may be provided. Therefore, when the values of the temperatures corresponding to the voltage values at every 1 mV and 2 mV of the output, voltages are obtained and the values of the output voltages are then used as the address signals and the values of the corresponding temperatures are written by 4-digit BCD in the corresponding addresses in the memories 5 and 6, the temperature data corresponding to the output voltages of the temperature detecting means 1a can be obtained by the 4 digits of the BCD mode from the memories 5 and 6. These temperature data are output from the data terminals 5d and 6d of the memories 5 and 6 and input through the data lines $5d_0$, $5d_7$, $6d_0$, $6d_7$ to the processor (not shown).

The temperature data are read out from the memories 5 and 6 in the following manner. The A/D converter 4 converts by the control signal 10aA of the A/D converter controller 10 at every predetermined time interval, and, when the A/D conversion is finished, the converter 4 outputs an end signal 4bB. When this end signal 4bB is applied to the read-out terminals 5b and 6b, the outputs of the memories 5 and 6 become the read-out mode, and, if the chip select signal terminals 5a and 6a are enabled by the outputs from the AND gates 9a and 9b, the contents of the memories 5 and 6 are read out from the data terminals 5d or 6d. In this case, decode signals 7a and 7b are sequentially output at a predetermined time interval so as to sequentially read out the temperature data of the memories 5 and 6.

If the end signal 4bB is not presented from the A/D converter 4 even if the chip select signal terminals 5a and 6a are active, the wait signal (WAIT) is output from the AND gate 12. Thus, since the signal is not enabled for the read signal 8, it remains in the wait state until the end signal 3bB is output, and reading operation waits, and when the end signal 4bB is output, reading is completed.

In the embodiment described above, the output voltages are obtained at every 1 mV or 2 mV. However, the present invention is not limited to that particular embodiment. For example, if the capacity of the memories is increased, the scale of the output voltage of FIG. 5 is reduced, for example, at every 0.5 mV, and the corresponding temperatures are stored in the memories, providing greater accuracy.

In the embodiment described above, the A/D converter 4 is constructed to form the ready/wait states at the read-out side by utilizing the high speed elements. However, the present invention is not limited to this particular embodiment. For example, the A/D converter 4 may be formed of low speed elements. Further, when a multiplexer and its drive circuit are provided at the input side, a number of temperature sensors may be connected. An example of this is shown in FIG. 6.

Figure 1:
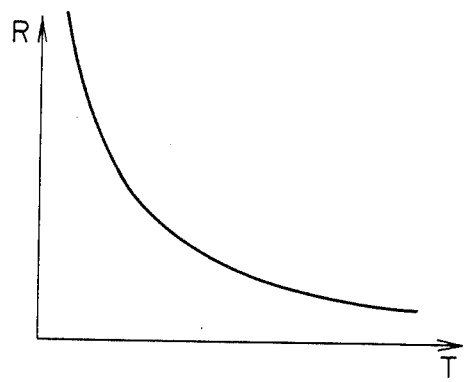
FIG. 1 is a view showing the temperature-resistance characteristic of a conventional thermistor.
Figure 2:
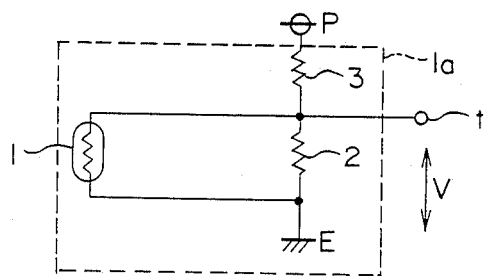
FIG. 2 is a circuit diagram showing an example of a conventional linearizing circuit for linearizing the characteristic of the thermistor.
Figure 3:
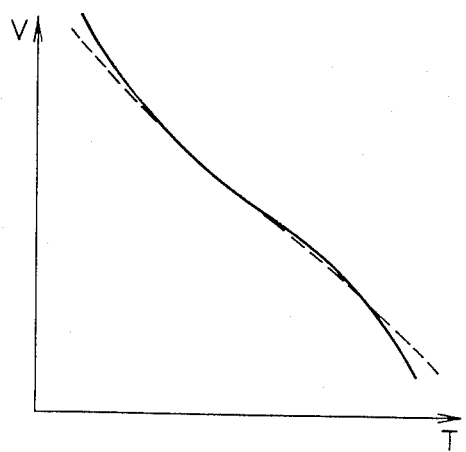
FIG. 3 is a diagram showing the temperature-voltage characteristic of the circuit of FIG. 2.
Figure 6:
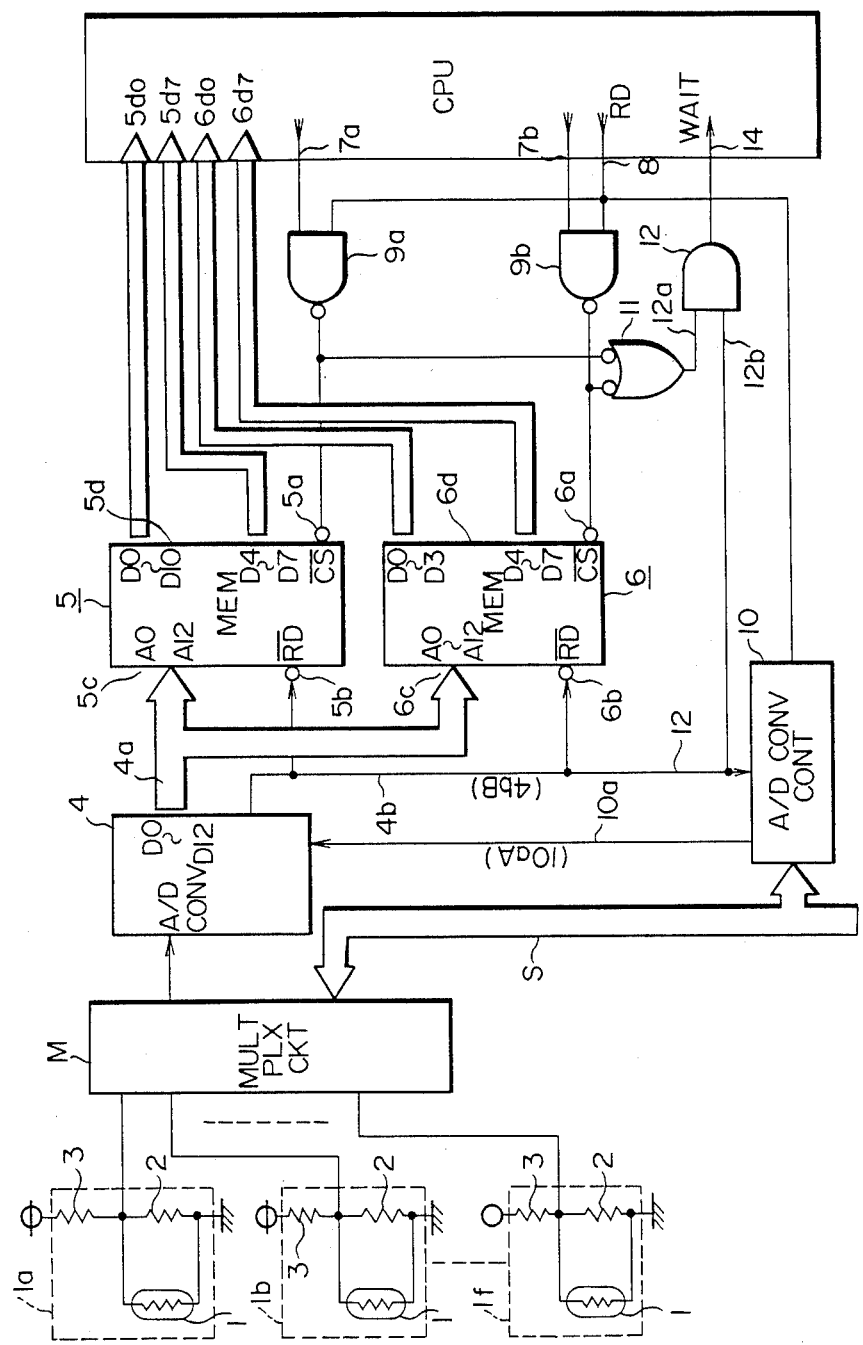
FIG. 6 is a block circuit diagram showing another embodiment of the present invention.

FIG. 6 is a block circuit diagram showing an example using a multiplexer. In FIG. 6, the same reference numerals as those in FIG. 1 denote the same or corresponding portions. Reference numerals 1a to 1f designate a plurality of temperature detecting means, each having a thermistor 1, a resistor 2 connected in parallel with the thermistor 1, and a resistor 3 connected in series with the thermistor 1 and the resistor 2. Reference symbol M designates a multiplexer circuit as a signal selecting means to, for example, select arbitrary temperature detecting means 1a to 1f by the selection signal S from a processor (not shown) which is contained, for example, in a microcomputer. Numeral 4 designates an analog-to-digital converter (hereinafter referred to as an A/D converter) receiving an output voltage of any one of the temperature detecting means 1a to 1f selected by the multiplexer circuit M to convert a digital signal. The remaining elements shown in FIG. 6 are substantially the same as those in the embodiment shown in FIG. 4 and, therefore, detailed descriptions are omitted for simplicity.

In this particular embodiment, the multiplexer circuit M has six inputs correspondingly receiving the outputs of the six temperature detecting means 1a to 1f. However, when the number of temperature detecting means increases, the number of inputs to the multiplexer circuit will also increase. Further, in the embodiment described above, the multiplexer selection signal S is a signal from a processor, such as an external microcomputer. However, the present invention is not limited to that particular embodiment. For example, the multiplexer selection signal may be manually set. In the embodiment described above, the thermistor has been described. However, when the thermocouple or the temperature measuring resistor are used as the temperature sensor, the present invention may be similarly applied.

Further, the outputs of the memories 5 and 6 may be sent to a display circuit or branched out to a computer for processing. If associated with a device which utilizes a calculation, such as a microcomputer, the memory of the microcomputer may also be used to simplify the control circuit. When a temperature indicator, target temperature setting means, and temperature comparing means are added, the apparatus can be used as a temperature regulator or an alarm. Thus, the application range of the present invention is very wide.

According to the present invention as described above, the addresses of the memories can be directly accessed by the digital signal from the A/D converter, and the temperature data read out from the memories in response to the digital signal can be processed by the processor. Therefore, even if the temperature has non-linearity, accurate measurement can be obtained over a wide temperature range. Further, a complicated linearizing circuit of the conventional apparatus is not necessary to inexpensively perform the measurements of a plurality of temperatures within a simple circuit in a wide application range.

What is claimed is:

1. A temperature measuring apparatus comprising:
   a memory having a plurality of memory addresses storing contents corresponding, respectively, to a plurality of predetermined temperatures within a temperature measuring range of said measuring apparatus;
   temperature detecting means for detecting temperature and producing voltage signals representative thereof;
   an A/D converter for converting the voltage signals representing detected temperatures into digital signals having a form which corresponds to memory addresses in said memory;
   control means for operating said A/D converter to generate output digital signals respectively representing detected temperatures at predetermined time intervals and producing an output when the respective output digital signals have been generated at the predetermined time intervals;
   read-out means operated by a processor for reading out the contents of said memory in a temperature reading operation; and
   wait means connected to said processor for setting a wait state until receiving the output from said control means and delaying the temperature reading operation of said read-out means until after the conversion of the voltage signal into the output digital signal by said A/D converter has been completed at the predetermined time intervals.

2. A temperature measuring apparatus according to claim 1 wherein said temperature detecting means includes a thermistor, a first resistor connected in parallel with said thermistor, and a second resistor connected in series with said first resistor.

3. A temperature measuring apparatus according to claim 1 wherein said memory is a nonvolatile ROM IC.

4. A temperature measuring apparatus according to claim 1 wherein said processor is a microcomputer.

5. A temperature measuring apparatus comprising:
   a memory having a plurality of memory addresses storing contents corresponding, respectively, to a plurality of predetermined temperatures within a temperature measuring range of said measuring apparatus;
   a plurality of temperature detecting means for detecting temperature and producing voltage signals representative thereof;
   signal selection means for selecting voltage signals from one of said plurality of temperature detecting means;
   an A/D converter for converting selected voltage signals into digital signals having a form which corresponds to memory addresses in said memory;
   control means for operating said A/D converter to generate output digital signals respectively representing detected temperatures at predetermined time intervals and producing an output when the respective output digital signals have been generated at the predetermined time intervals;
   read-out means operated by a processor for reading out the contents of said memory in a temperature reading operation; and
   wait means connected to said processor for setting a wait state until receiving the output from said control means and delaying the temperature reading operation of said read-out means until after the conversion of the voltage signal into the output digital signals by said A/D converter has been completed at the predetermined time intervals.

6. A temperature measuring apparatus according to claim 5 wherein said plurality of temperature detecting means each includes a thermistor, a first resistor connected in parallel with said thermistor, and a second resistor connected in series with said first resistor.

7. A temperature measuring apparatus according to claim 5 wherein said memory is a nonvolatile ROM IC.

8. A temperature measuring apparatus according to claim 5 wherein said processor is a microcomputer.

* * * * *